United States Patent
Huang et al.

(10) Patent No.: US 8,830,153 B2
(45) Date of Patent: Sep. 9, 2014

(54) LIQUID CRYSTAL DISPLAY PANEL AND METHOD FOR REPAIRING SIGNAL LINE THEREOF

(75) Inventors: Jun-yao Huang, Yonghe (TW); Yin-hsiang Teng, Yangmei Township (TW); Ren-tsai Hung, Taiping (TW); Han-chang Chen, Taoyuan (TW); Chia-jung Han, Xinzhuang (TW)

(73) Assignee: Chunghwa Picture Tubes, Ltd., Bade, Taoyuan County (TW)

( * ) Notice: Subject to any disclaimer, the term of this patent is extended or adjusted under 35 U.S.C. 154(b) by 923 days.

(21) Appl. No.: 12/983,238

(22) Filed: Dec. 31, 2010

(65) Prior Publication Data

US 2012/0026076 A1 Feb. 2, 2012

(30) Foreign Application Priority Data

Jul. 30, 2010 (TW) ............................ 99125472 A
Sep. 30, 2010 (TW) ............................ 99133348 A

(51) Int. Cl.
*G09G 3/36* (2006.01)
*G09G 5/00* (2006.01)
*G09G 3/20* (2006.01)
*G02F 1/1362* (2006.01)

(52) U.S. Cl.
CPC .......... *G09G 3/2092* (2013.01); *G09G 2230/08* (2013.01); *G02F 1/136204* (2013.01); *G09G 3/3648* (2013.01); *G02F 2001/136263* (2013.01); *G02F 1/136259* (2013.01)
USPC ............................. 345/92; 345/204; 345/214

(58) Field of Classification Search
CPC .... G09G 3/006; G02F 1/1309; G02F 1/36259
USPC ....................................... 345/87, 92, 204, 214
See application file for complete search history.

(56) References Cited

U.S. PATENT DOCUMENTS

| | | | | |
|---|---|---|---|---|
| 6,025,891 A | * | 2/2000 | Kim | 349/40 |
| 6,111,621 A | * | 8/2000 | Kim et al. | 349/54 |
| 6,639,634 B1 | * | 10/2003 | Zhang et al. | 349/54 |
| 2003/0095229 A1 | * | 5/2003 | Inoue et al. | 349/187 |
| 2007/0109235 A1 | * | 5/2007 | Hsu et al. | 345/87 |
| 2008/0278648 A1 | * | 11/2008 | Chang | 349/40 |
| 2009/0284679 A1 | * | 11/2009 | Kim et al. | 349/54 |
| 2011/0278574 A1 | * | 11/2011 | Chuang et al. | 257/59 |

FOREIGN PATENT DOCUMENTS

| | | |
|---|---|---|
| TW | I312890 | 8/2009 |
| TW | I323822 | 4/2010 |

* cited by examiner

*Primary Examiner* — William Boddie
*Assistant Examiner* — Alecia D English
(74) *Attorney, Agent, or Firm* — Cheng Ju-Chiang

(57) ABSTRACT

A display panel and a method for repairing signal lines thereof are disclosed. The display panel includes at least one shorting bar, switches, and auxiliary repair lines. The switches are electrically coupled respectively to signal lines and the at least one shorting bar. Both ends of each of the auxiliary repair lines overlap one of connections between the switches and the at least one shorting bar. When a signal line is damaged, the method for repairing includes: breaking off each of the connections between the switches and the at least one shorting bar by cutting; and welding both ends of one of the auxiliary repair lines which correspond to the damaged signal line with both sides of one of the connections which correspond to the damaged signal line.

7 Claims, 9 Drawing Sheets

LIQUID CRYSTAL DISPLAY PANEL AND METHOD FOR REPAIRING SIGNAL LINE THEREOF

TECHNICAL FIELD OF THE INVENTION

The present invention relates to a display panel, and especially to a liquid crystal display (LCD) panel and a method for repairing signal lines thereof.

BACKGROUND OF THE INVENTION

FIG. 1 is a top view schematically illustrating a repairing of a signal line in a conventional liquid crystal display (LCD) panel. Referring to FIG. 1, the LCD panel includes a substrate 10, which comprises a plurality of scan lines 12 and a plurality of signal lines 14, and the scan lines 12 are parallel to each other and cross the signal lines 14. A plurality of pixel regions and a thin film transistor (TFT) array are defined between the scan lines 12 and the signal lines 14 (not shown). In addition, the substrate 10 comprises a scan line driver chip 22 and a plurality of signal line driver chips 24, in which only a signal line driver chip 24 is depicted for clarity. The scan line driver chip 22 is utilized to drive the scan lines 12 in sequence, and the signal line driver chips 24 are utilized to provide voltage data of the pixels for the signal lines 14.

As the number of the pixels increases, the intervals between the adjacent scan lines 12 or the adjacent signal lines 14 are only a few microns on the substrate 10. Thus, the signal lines 14 may be broken off due to foreign bodies (such as dusts) in the manufacturing process. In order to overcome the problem of the disconnection of the signal lines 14, a repair line 16 is disposed on the substrate 10 for repairing the broken signal lines in the conventional LCD panel. The repair line 16 is disposed on the periphery of an active area 11 defined by the scan lines 12 and the signal lines 14, in addition, the repair line 16 crosses the signal lines 14 and separated therewith by an isolation layer. When one of the signal lines 14 is broken off, the intersection of the repair line 16 and the broken signal line 14 can be welded by laser, and then the data provided from the signal line driver chip 24 is transmitted to the broken signal line 14 via the repair line 16.

However, with an increase of the pixel number, the numbers of scan lines 12 and signal lines 14 become tremendous. The scan line driver chip 22 and the signal line driver chips 24 occupy most of the substrate 10 periphery area, so the available periphery area of the substrate 10 becomes smaller and smaller. Therefore, the repair line 16 is difficult to be disposed.

SUMMARY OF THE INVENTION

Accordingly, an objective of the present invention is to provide a display panel which the periphery area being occupied can be reduced, thereby overcoming the problems of the above-mentioned prior art.

Another objective of the present invention is to provide a method for repairing signal lines of the display panel. The signal lines can be repaired by the structure of the display panel without disposing a repair line.

To achieve the foregoing objectives, according to an aspect of the present invention, a display panel is provided. In a first preferred embodiment of the present invention, the display panel has a plurality of signal lines being disposed on a substrate. The display panel includes at least one shorting bar and a plurality of switches. The switches are electrically coupled respectively to the signal lines and the at least one shorting bar, and each of the switches includes a gate pattern, a source line and a drain line.

The gate pattern is disposed on the substrate. The gate pattern has a first region and a second region, in which the first region and the second region are connected by a connecting portion. The gate patterns of the switches are electrically coupled with each other via the first region and the second region thereof. The source line is disposed on the gate pattern, and an insulation layer is disposed between the source line and the gate pattern. One end of the source line is electrically coupled to one of the signal lines. The drain line is disposed on the gate pattern, and the insulation layer is disposed between the drain line and the gate pattern. One end of the drain line is electrically coupled to the shorting bar.

In the first preferred embodiment of the present invention, the switches include a plurality of thin film transistor (TFT) switches. Moreover, the gate pattern, the source line and the drain line are respectively a gate, a source and a drain of the TFT switch.

In the first preferred embodiment of the present invention, the first regions of the gate patterns of the two adjacent switches are electrically coupled with each other, and the second regions thereof are electrically coupled with each other. The source line and the drain line expose the connecting portion of the gate pattern. In addition, the source lines and the drain lines of the switches and the signal lines are made of same metal material, and the shorting bar and the gate pattern of the switches are made of same metal material.

According to another aspect of the present invention, a method for repairing the signal lines of the display panel in the first preferred embodiment is provided. The method is adapted for repairing a damaged signal line. The method includes a cutting process and a welding process.

The cutting process is by breaking off the connecting portion of the gate pattern which corresponds to the damaged signal line and separating the first region of the gate pattern from adjacent first regions. The welding process is by welding the source line and the drain line which correspond to the damaged signal line with the first region of the gate pattern. A signal from the damaged signal line is transmitted to the damaged signal line via the first region of the gate pattern and the welded source line.

In the first preferred embodiment, the welding process can be implemented by a laser welding, and the source line and the drain line penetrate the insulation layer to electrically couple to the gate pattern in the welding process.

In addition, a display panel is provided in a second preferred embodiment of the present invention. The display panel has a plurality of signal lines which are disposed on a substrate. The display panel further includes at least one shorting bar, a plurality of switches, a plurality of auxiliary repair lines and an insulation layer. The switches are electrically coupled respectively to the signal lines and the at least one shorting bar. Both ends of each of the auxiliary repair lines overlap one of a plurality of connections between the switches and the at least one shorting bar. The insulation layer is disposed between the auxiliary repair lines and the connections.

In the second preferred embodiment, each of the switches includes a gate pattern, a source line and a drain line. The gate pattern is disposed on the substrate. The source line is disposed on the gate pattern, and an insulation layer is disposed between the source line and the gate pattern. One end of the source line is electrically coupled to one of the signal lines. The drain line is disposed on the gate pattern, and the insulation layer is disposed between the drain line and the gate pattern. One end of the drain line is electrically coupled to the shorting bar.

In the second preferred embodiment, the switches include a plurality of thin film transistor (TFT) switches which are connected in cascade through the gates thereof. In addition, the source lines of the switches, the drain lines and the signal lines are made of same metal material, and the shorting bar, the auxiliary repair lines and the gate pattern of the switches are made of same metal material.

A method for repairing the signal lines of the display panel in the second preferred embodiments is provided. The method is adapted for repairing a damaged signal line. The method includes a cutting process and a welding process.

The cutting process is by breaking off each of the connections between each of the switches and the at least one shorting bar. The welding process is by welding both ends of one of the auxiliary repair lines which correspond to the damaged signal line with both sides of one of the connections which correspond to the damaged signal line. The welding process can be implemented via a laser welding.

In the second preferred embodiment, a signal from the damaged signal line is transmitted to the damaged signal line via the shorting bar, the auxiliary repair line and the switch which correspond to the damaged signal line. The switch which corresponds to the damaged signal line is in an on-state.

In accordance with the display panel and the method for repairing the signal lines thereof, the problem that the repair line needs to be disposed on the periphery area of the substrate has been solved whereby a circuit route of simplified lighting replacing the repair line, thereby increases the available periphery area of the substrate.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
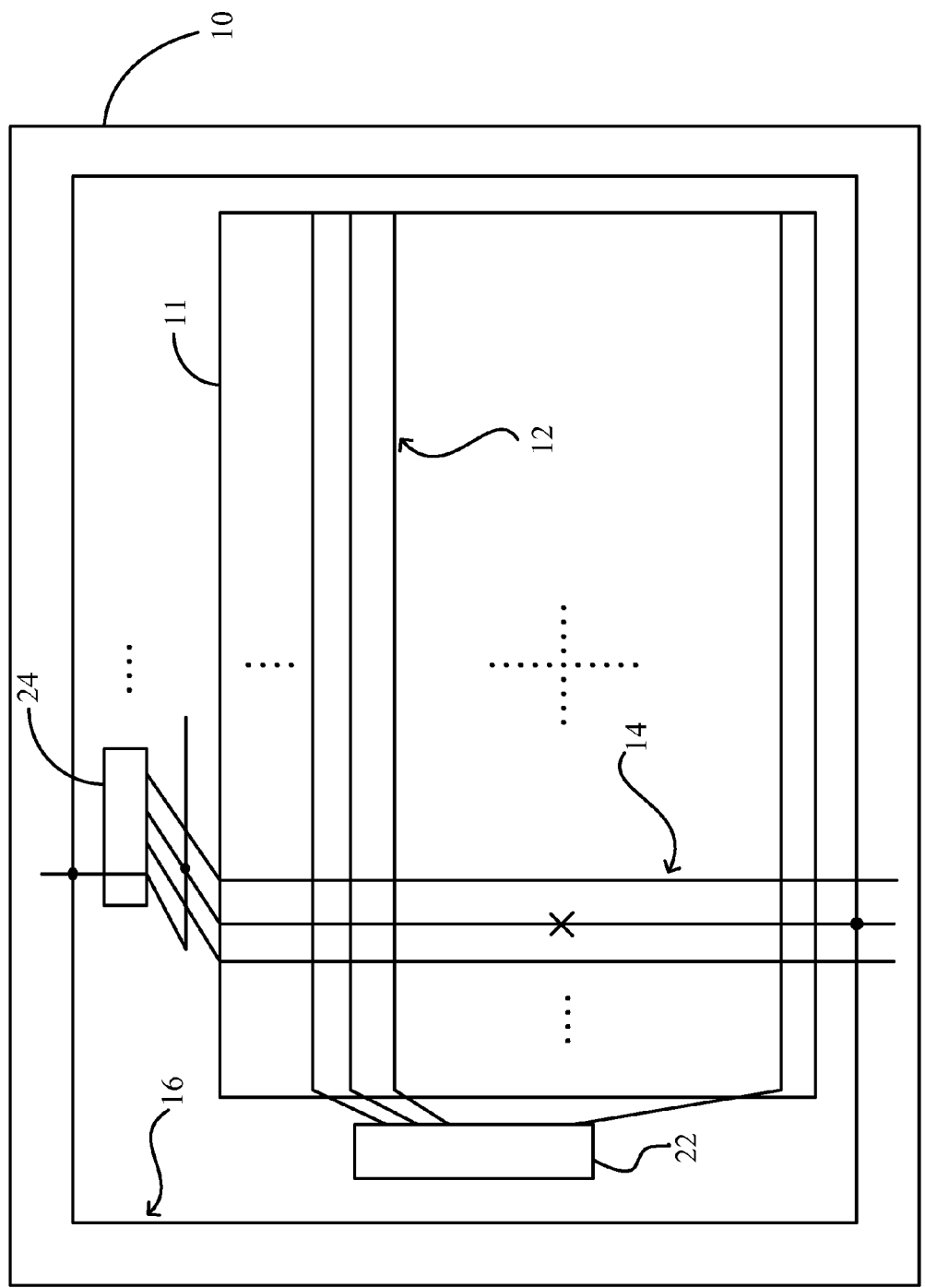
FIG. 1 is a top view schematically illustrating repairing a signal line in a conventional liquid crystal display (LCD) panel.

The present invention will now be described in detail with reference to a few preferred embodiments thereof as illustrated in the accompanying drawings. The same reference numerals refer to the same parts or like parts throughout the various Figures. The following will explain a display panel according to a first preferred embodiment of the present invention in detail with drawings.

Figure 2:
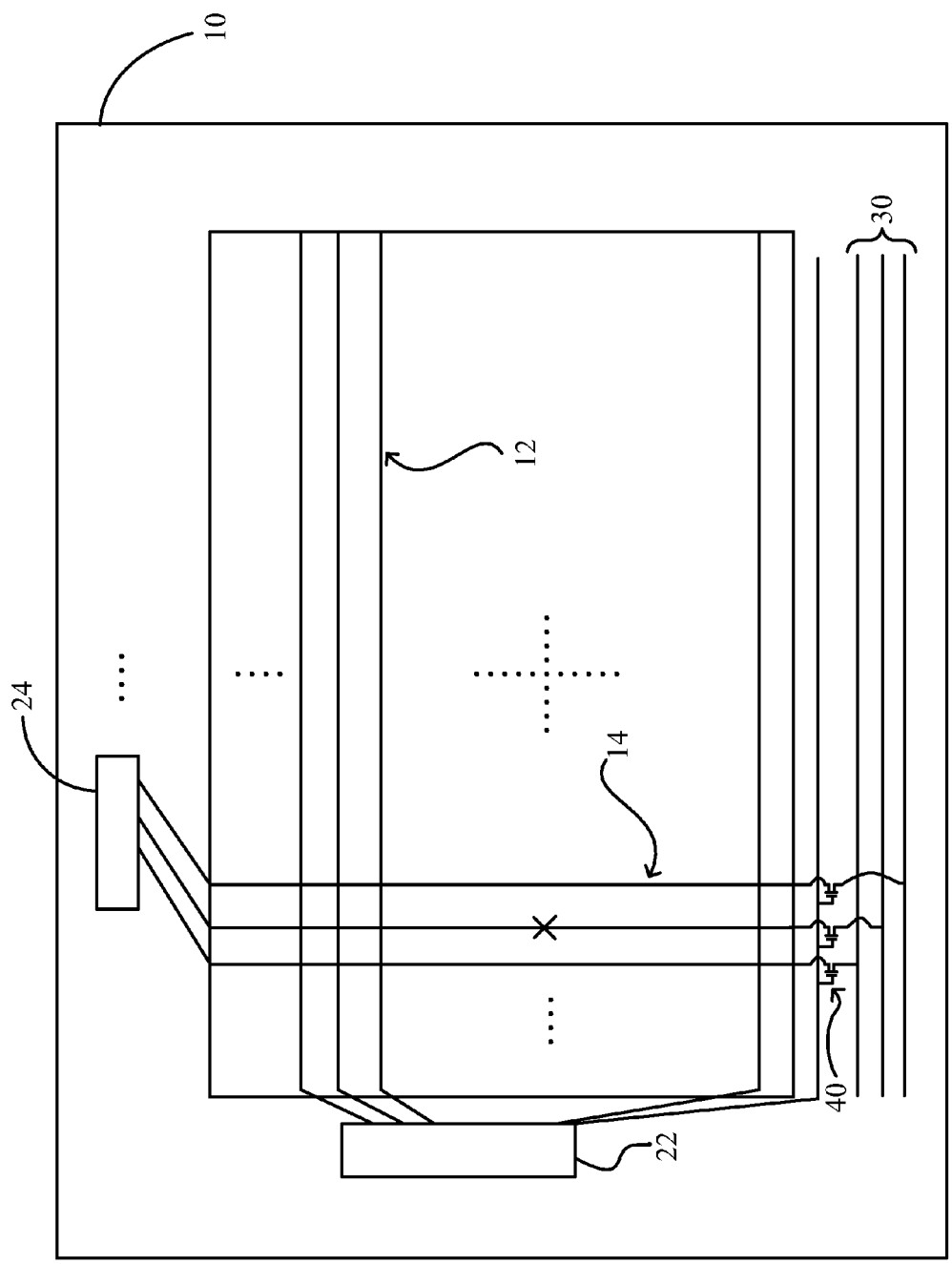
FIG. 2 is a schematic drawing illustrating the display panel according to the first preferred embodiment of the present invention.

FIG. 2 is a schematic drawing illustrating the display panel according to the first preferred embodiment of the present invention. Referring to FIG. 2, the display panel includes a substrate 10, a plurality of signal lines 14, a plurality of scan lines 12, a scan line driver chip 22, a plurality of signal line driver chip 24, a shorting bar group 30, and a plurality of switches 40. The scan lines 12 are parallel to each other and cross the signal lines 14, of which the scan lines 12 are disposed on the substrate 10. The scan line driver chip 22 and the signal line driver chip 24 are disposed on the periphery area of the substrate 10. The scan line driver chip 22 is utilized to driver the scan lines 12 in sequence, and the signal line driver chip 24 are utilized to provide voltage data of the pixels for the signal lines 14. Each of the switches 40 can be implemented by a thin film transistor (TFT).

Figure 3:
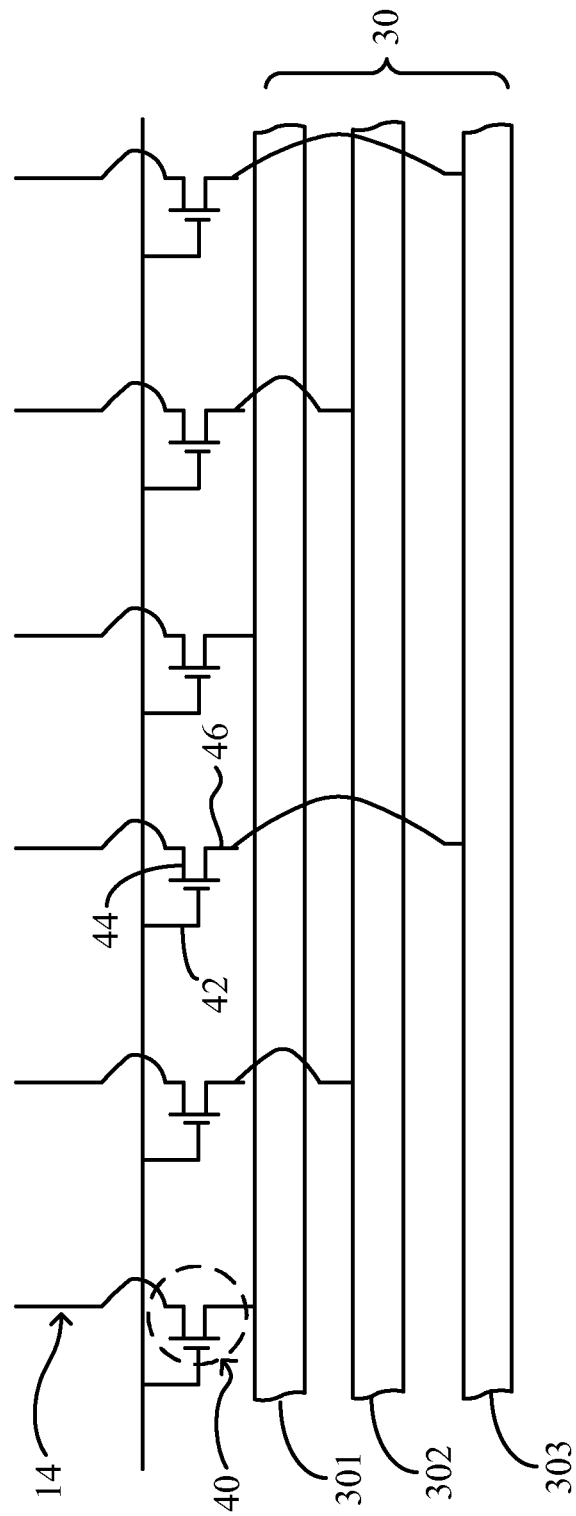
FIG. 3 is a schematic drawing illustrating a circuit route of simplified lighting according to the first preferred embodiment of the present invention.
Figure 4:
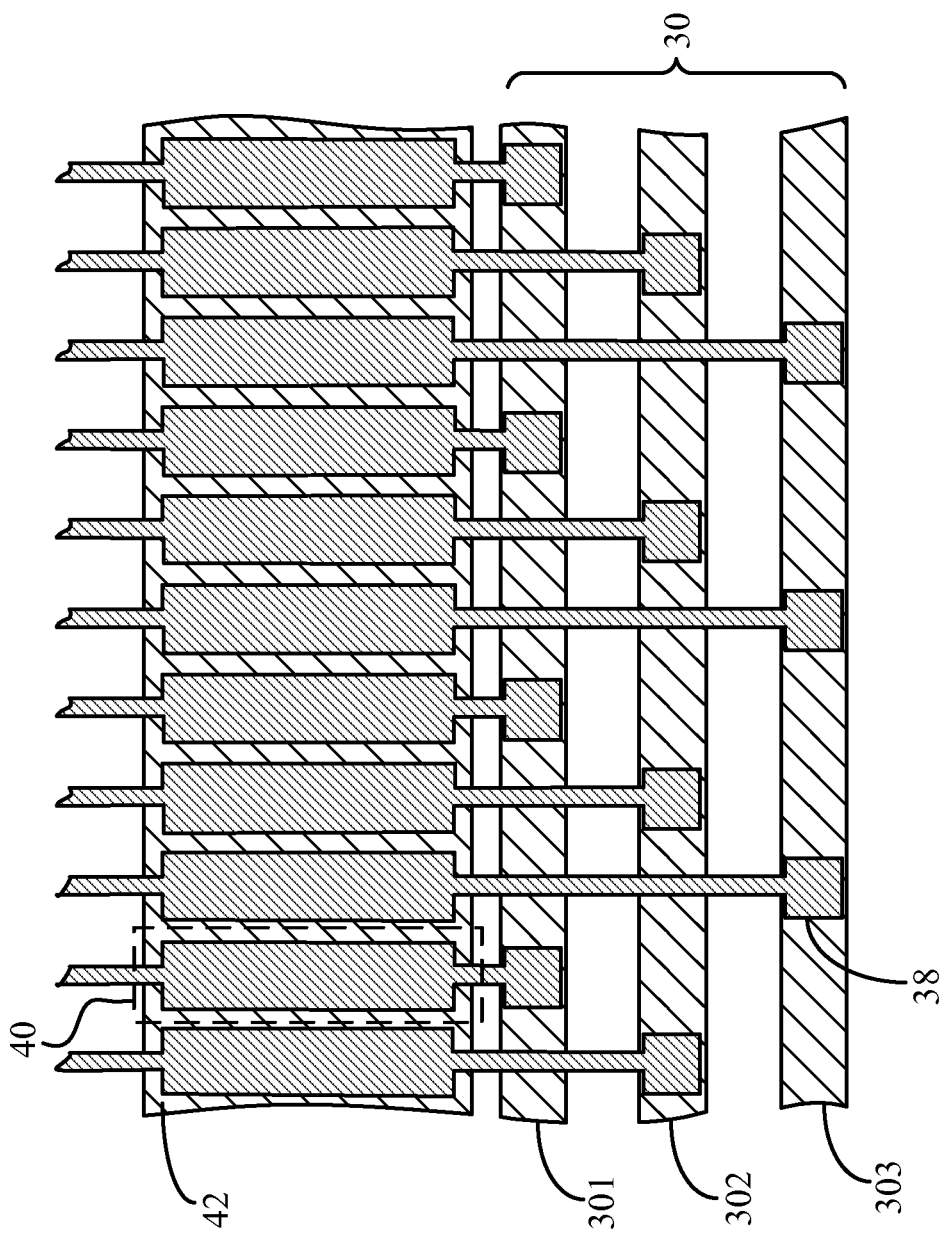
FIG. 4 is a schematic drawing illustrating a layout design of FIG. 3.

FIG. 3 is a schematic drawing illustrating a circuit route of simplified lighting according to the first preferred embodiment of the present invention, and FIG. 4 is a schematic drawing illustrating a layout design of FIG. 3; namely, FIGS. 3 and 4 illustrate the circuit route of simplified lighting in a cell test process. Referring to FIGS. 3 and 4, the circuit route of simplified lighting includes the shorting bar group 30 and the switches 40. The shorting bar group 30 is disposed on the substrate 10 and includes at least one shorting bar. In the cell test process, the shorting bar group 30 is utilized to transmit test signals to the signal lines 14 for inspecting whether the display panel has abnormal defects (for example: light, dark spots or an unusual color display). If one of the signal lines 14 is broken, an unusual color display is generated on the color filters which correspond to the broken signal lines 14. In general, the shorting bar group 30 comprises three shorting bars, such as a first shorting bar 301, a second shorting bar 302 and a third shorting bar 303 for inspecting the signal lines 14 to display red, green and blue.

As mentioned above, the switches 40 are a plurality of TFT switches which are connected in cascade through the gates thereof. The switches 40 are respectively electrically coupled to the signal lines 14 and the first shorting bar 301, the second shorting bar 302 and the third shorting bar 303. Both ends of the switches 40 and the shorting bar group 30 (the first shorting bar 301, the second shorting bar 302, and the third shorting bar 303) are belong to two different metal layers, and an insulation layer is disposed therebetween (not shown for clarity) for protection. Thus, one end of the switches 40 is electrically coupled to the first shorting bar 301, the second shorting bar 302 and the third shorting bar 303 through a bonding pad 38 (Jumper Layer) to penetrate the insulation layer.

Each of the switches (i.e., TFTs) includes a gate pattern 42, a source line 44 and a drain line 46. For instance, the gate pattern 42, the source line 44 and the drain line 46 are respectively a gate, a source and a drain of the TFT switches. It should be noted that the gate patterns 42 of the switches 40 are electrically coupled with each other as shown in FIG. 4, and the gate patterns 42 are electrically coupled to the scan line driver chip 22 as shown in FIG. 2. During the cell test process, an external inspection apparatus output a high voltage (Vgh) signal to the gate patterns 42 of the switches 40, making the source lines 44 and the drain lines 46 of the switches 40 conduct. When the switches 40 is conducted, the test signals can be transmitted to the signal lines 14 via the first shorting bar 301, the second shorting bar 302 and the third shorting bar 303 for inspection.

Figure 5:
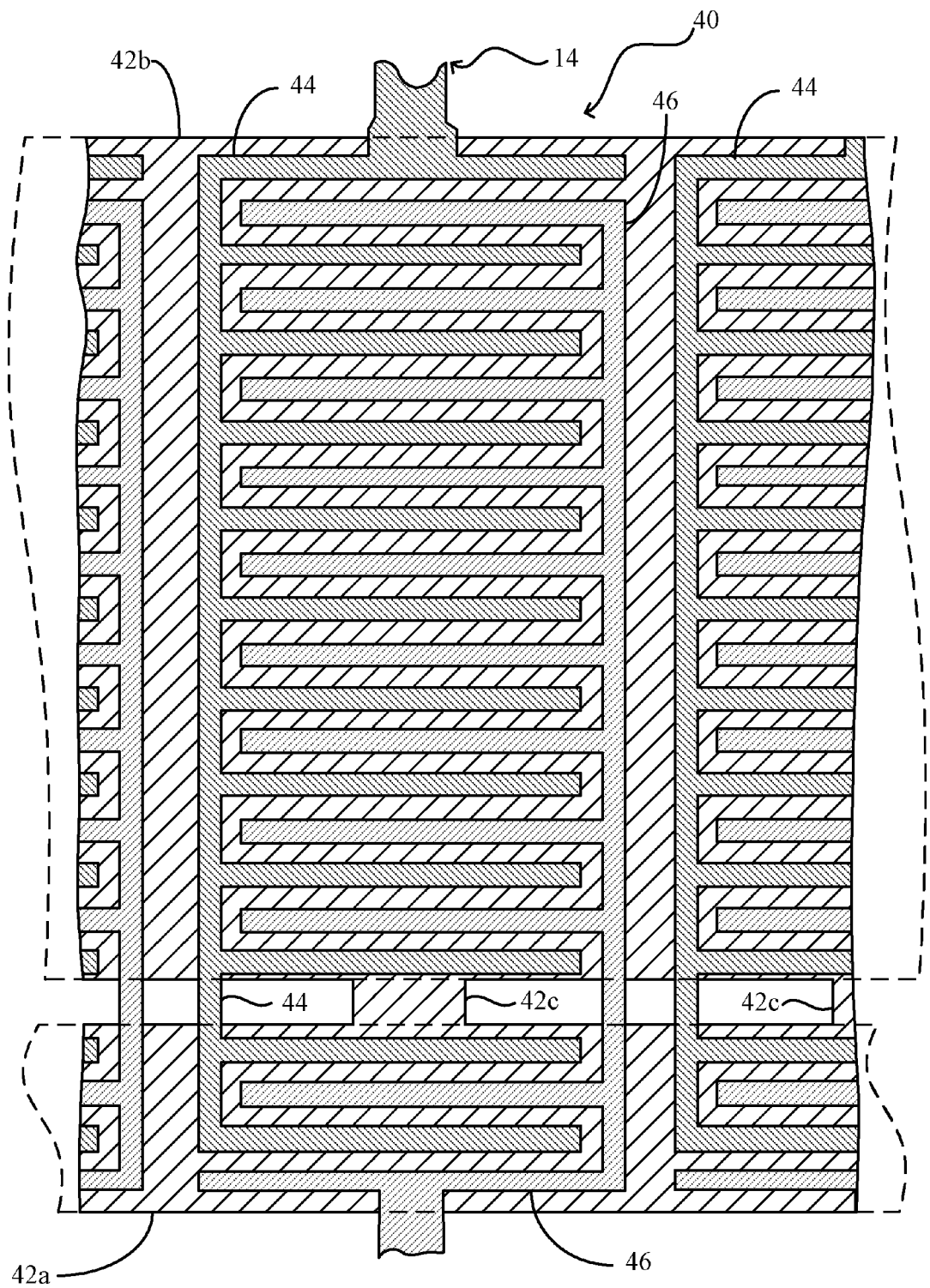
FIG. 5 is a top view illustrating a layout design of the switches in the first embodiment of the present invention.

FIG. 5 is a top view illustrating a layout design of the switches in the first embodiment of the present invention, which is utilized to explain the detailed structures of the switches 40. Referring to FIG. 5, the gate pattern 42 (designated as 42a, 42b and 42c) is disposed on the substrate 10, and the gate pattern 42 has a first region 42a and a second region 42b wherein the first region 42a and the second region 42b are connected by a connecting portion 42c. The manner for connecting the gate pattern 42a of any two adjacent switches 40 is that the first regions 42a are electrically coupled with each other and the second regions 42b thereof are electrically coupled with each other. It should be noted that the source line 44 and the drain line 46 expose the connecting portion 42c of the gate pattern 42.

The source line 44 is disposed on the gate pattern 42, and the insulation layer (not shown) is disposed between the source line 44 and the gate pattern 42 thereby serving as an insulator between the gate and the source of the TFT switch. One end of the source line 44 is electrically coupled to one of the signal lines 14. The drain line 46 is disposed on the gate pattern 42; also the insulation layer (not shown) is disposed between the drain line 46 and gate pattern 42 thereby serving as an insulator between the gate and the drain of the TFT switch. One end of the drain line 46 is electrically coupled to the shorting bar group 30. Furthermore, the source line 44 and the drain line 46 are designed as comb shapes to increase a W/L ratio of a transistor (W is designated as a channel width of the transistor, and L is designated as a channel length of the transistor) for benefiting the conduction of the switch 40.

The source lines 44 of the switches 40, the drain lines 46 and the signal lines 14 are made of same metal material; for example, they are formed in the same manufacturing process in array process of the LCD panel. Similarly, the shorting bar group 30 and the gate patterns 42 of the switches 40 are made of same metal material; for example, they are formed in the same manufacturing process in array process of the LCD panel. Therefore, it is not required to increase additional manufacturing processes.

Figure 6:
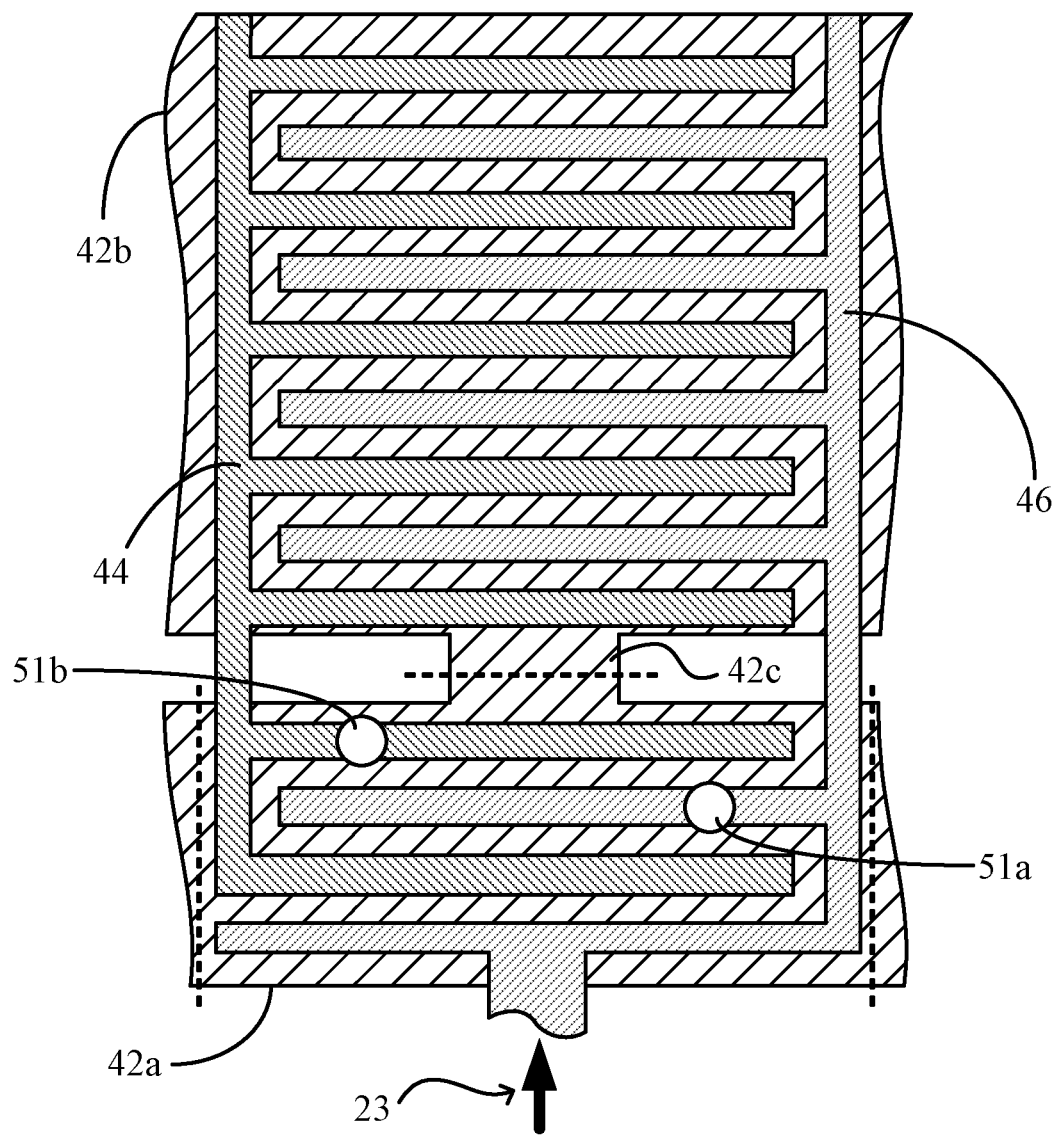
FIG. 6 is a schematic drawing illustrating a circuit route structure for repairing the signal lines according to the first preferred embodiment of the present invention.

The method for repairing the signal lines of the display panel in the first preferred embodiment of the present invention will be explained in detail in the following. Referring to FIG. 6, FIG. 6 is a schematic drawing illustrating a circuit route structure for repairing the signal lines according to the first preferred embodiment of the present invention. A position of a damaged signal line 14 can be inspected on the display panel in the first preferred embodiment of the present invention after the cell test process. In the first preferred embodiment, the method for repairing the signal lines is aimed at the switch 40 which corresponds to the damaged signal line 14. The method for repairing the signal lines includes a cutting process and a welding process.

The cutting process is by breaking off the connecting portion 42c of the gate pattern 42 and separating the corresponding first region 42a along the dotted lines from adjacent first regions. The welding process is welding the source line 44 the drain line 46 which correspond to the damaged signal line 14 with the first region 42a of the gate pattern 42.

It should be noted that the cutting process is cutting the connecting portion 42c of the switch 40 which corresponds to the damaged signal line 14, but without cutting off the source line 44 and the drain line 46 of the switch 40. In addition, the welding process is only welding the source line 44 and the drain line 46 which correspond to the damaged signal line 14 into the first region 42a of the gate pattern 42, making the source line 44 and the drain line 46 electrically coupling to the first region 42a of the gate pattern 42. The cutting process herein can be implemented by a laser cutting. The welding process can be implemented via a laser welding, thereby making the source line 44 and the drain line 46 penetrate the insulation layer to electrically couple to the gate pattern 42.

The display signal 23 of the damaged signal line 14 is given off form the signal line driver chip 24 and transmitted to the damaged signal line 14 through the shorting bar group 30 (refer to FIG. 4), the welded drain line 46 (via a welding spot 51a), the first region 42a and the welded source line 44 (via a welding spot 51b) for repairing the signal.

As mentioned above, in the display panel of the first preferred embodiment of the present invention, the special structure of the switches 40 in the circuit route of simplified lighting are designed as the first regions 42a and the second regions 42b. Moreover, the connecting portions 42c are uncovered by the source lines 44 and the drain lines 46, so that the connecting portions 42c can be broken off during the process of repairing, and than the source line 44 can be welded into the first region 42a for transmitting the display signal 23. Therefore, the problem that the repair line needs to be disposed on the periphery area of the substrate has been solved, and the available periphery area of the substrate is also increased.

Figure 7:
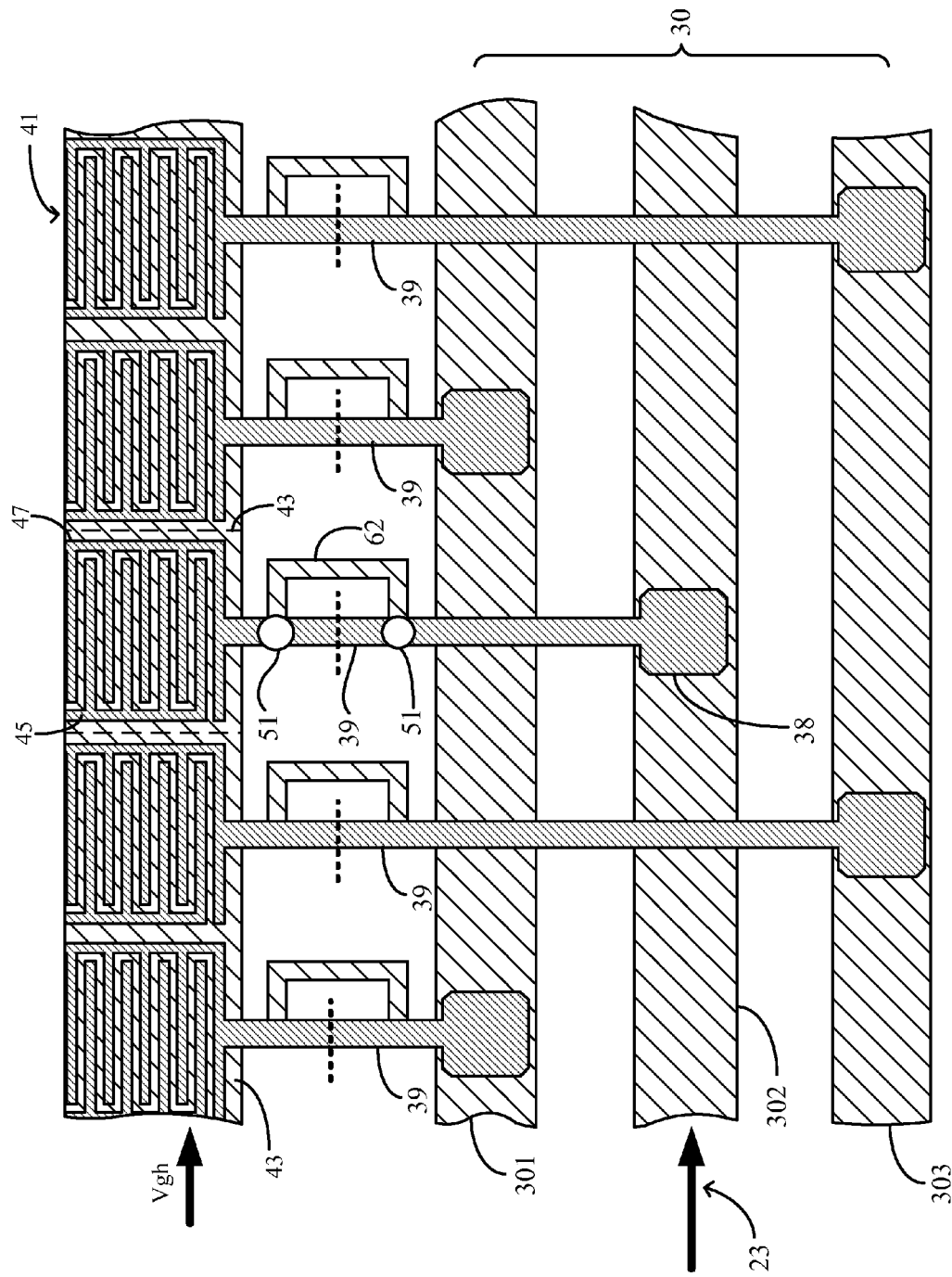
FIG. 7 is a schematic drawing illustrating a circuit route structure for repairing the signal lines according to the second preferred embodiment of the present invention.

The following will explain an display panel according to a second preferred embodiment of the present invention in detail with drawings. FIG. 7 is a schematic drawing illustrating a circuit route structure for repairing the signal lines according to the second preferred embodiment of the present invention. Referring to FIGS. 2 and 7, the display panel includes a substrate 10, a plurality of signal lines 14, a plurality of scan lines 12, a scan line driver chip 22, a plurality of signal line driver chip 24, a shorting bar group 30, a plurality of switches 41 and a plurality of auxiliary repair line 62. The descriptions of the same elements in the display panel of the first preferred embodiment have been explained as above mention, so we need not go into detail herein.

The following will explain the switches 41 that is similar to the switches 40 in the first preferred embodiment. The switches 41 are a plurality of TFT switches which are connected in cascade through the gates thereof. The switches 41 are electrically coupled respectively to the signal lines 14 and the first shorting bar 301, the second shorting bar 302 and the third shorting bar 303. Both ends of the switches 41 and the shorting bar group 30 (the first shorting bar 301, the second shorting bar 302 and the third shorting bar 303) are belong to two different metal layers, and an insulation layer is disposed therebetween (not shown for clarity) for protection. Thus, one end of the switches 41 is electrically coupled to the first shorting bar 301, the second shorting bar 302 and the third shorting bar 303 through a bonding pad 38 (Jumper Layer) to penetrate the insulation layer.

Referring to FIG. 7, each of the switches (i.e., TFTs) 41 includes a gate pattern 43, a source line 45 and a drain line 47. For instance, the gate pattern 43, the source line 44 and the drain line 47 are respectively a gate, a source and a drain of the TFT switches. It should be noted that the gate pattern 43 of each of the switches 41 are electrically coupled with each other as shown in FIG. 4, and the gate patterns 43 are electrically coupled to the scan line driver chip 22 as shown in FIG. 2. During the cell test process, an external inspection apparatus output a high voltage (Vgh) signal to the gate patterns 43 of the switches 41, making the source lines 45 and the drain lines 47 of the switches 41 conduct. When switches 41 is conducted, the test signals can be transmitted to the signal lines 14 via the first shorting bar 301, the second shorting bar 302 and the third shorting bar 303 for inspection.

Referring to FIG. 7, the gate pattern 43 is disposed on the substrate 10. The difference from the first embodiment is that the gate pattern 43 is a face electrode, and the gate pattern 43 of each of the switches 41 is electrically coupled with each other, that is, shares the same gate. The source line 45 is disposed on the gate pattern 43, and the insulation layer (not shown) which is disposed between the source line 45 and gate pattern 43 thereby serves as an insulator between the gate and the source of the TFT switch. One end of the source line 45 is electrically coupled to one of the signal lines 14 (not shown). The drain line 47 is disposed on the gate pattern 43, also the insulation layer (not shown) which is disposed between the drain line 47 and gate pattern 43 thereby serving as an insulator between the gate and the drain of the TFT switch. One end of the drain line 47 is electrically coupled to the shorting bar group 30 via a connection 39. Furthermore, the source line 45 and the drain line 47 are designed as comb shapes to increase a W/L ratio of a transistor (W is designated as a channel width of the transistor, and L is designated as a channel length of the transistor) for benefiting the conduction of the switch 41.

The display panel of the second embodiment of the present invention further includes a plurality of auxiliary repair lines 62. Both ends of each of the auxiliary repair lines 62 overlap one of a plurality of connections 39 between the switches 41 and the shorting bar group 30. An insulation layer (not shown) is disposed between the auxiliary repair lines 62 and the connections 39.

The source lines 45 of the switches 41, the drain lines 47 and the signal lines 14 are made of same metal material; for example, they are formed in the same manufacturing process in array process of the LCD panel. Similarly, the shorting bar group 30, the auxiliary repair lines 62 and the gate patterns 43 of the switches 41 are made of same metal material; for example, they are formed in the same manufacturing process in array process of the LCD panel. Therefore, it is not required to increase additional manufacturing processes.

The method for repairing the signal lines of the display panel in the second preferred embodiment of the present invention will be explained in detail in the following. Please continue to refer to FIG. 7, in the second preferred embodiment, the method for repairing the signal lines is aimed at the auxiliary repair line 62 which corresponds to the damaged signal line 14. The method for repairing the signal lines 14 includes a cutting process and a welding process.

The cutting process is by breaking off each of the connections 39 between the switches 41 and the shorting bar group 30. The welding process is welding both ends of one of the auxiliary repair lines 62 which correspond to the damaged signal line 14 with both sides of the connection 39 between the switch 41 and the shorting bar group 30 which correspond to the damaged signal line 14.

It should be noted that the cutting process requires cutting each of the connections 39 between each of the switches 41 and the shorting bar group 30. In addition, the welding process only requires welding both ends of one of the auxiliary repair lines 62 which correspond to the damaged signal line 14 into both sides of the connection 39, which makes the drain line 47 to electrically couple to the shorting bar group 30, such as second shorting bar 302. The cutting process can be implemented via a laser cutting along the dotted lines. The welding process can be implemented via a laser welding at the welding spots 51, thereby making both ends of the auxiliary repair line 62 penetrate the insulation layer to electrically couple to the connection 39.

A display signal 23 of the damaged signal line 14 given off from the signal line driving chip 24 is transmitted to the damaged signal line 14 via the second shorting bar 302, the auxiliary repair line 62 and the switch 41 which correspond to the damaged signal line 14. Meanwhile, the signal line driving chip 24 provides a high voltage (Vgh) signal to the gate patterns 43, so that the switch 41 which corresponds to the damaged signal line 14 is in an on-state. Furthermore, the display signal 23 can be send to the damaged signal line 14 via the second shorting bar 302 for repairing.

As mentioned above, in the display panel of the second preferred embodiment of the present invention, the structures of the auxiliary repair lines 62 are utilized in the circuit route of simplified lighting, so that each of the connections 39 can be cut off during the process of repairing and both ends of one of the auxiliary repair lines 62 which correspond to the damaged signal line 14 can be welded into both sides of the connection 39. Therefore, the problem that the repair line needs to be disposed on the periphery area of the substrate has been solved, and the available periphery area of the substrate is also increased.

It should be noted that the present invention does not be limited the implementation without the repair line, and it also can be implemented with the repair line. More specifically, the repair line 16 (as shown in FIG. 1) can be designed to cross the shorting bar group 30 in an insulated manner. When it requires to be repaired, the above-mentioned welding process (such as laser welding) is performed at the intersections between the repair line 16, the signal lines 14 and the shorting bar group 30, so that the display signal 23, which provided from the signal line driving chip 24, is transmitted to the damaged signal line 14 by the repair line 16 and the shorting bar group 30.

Figure 8:
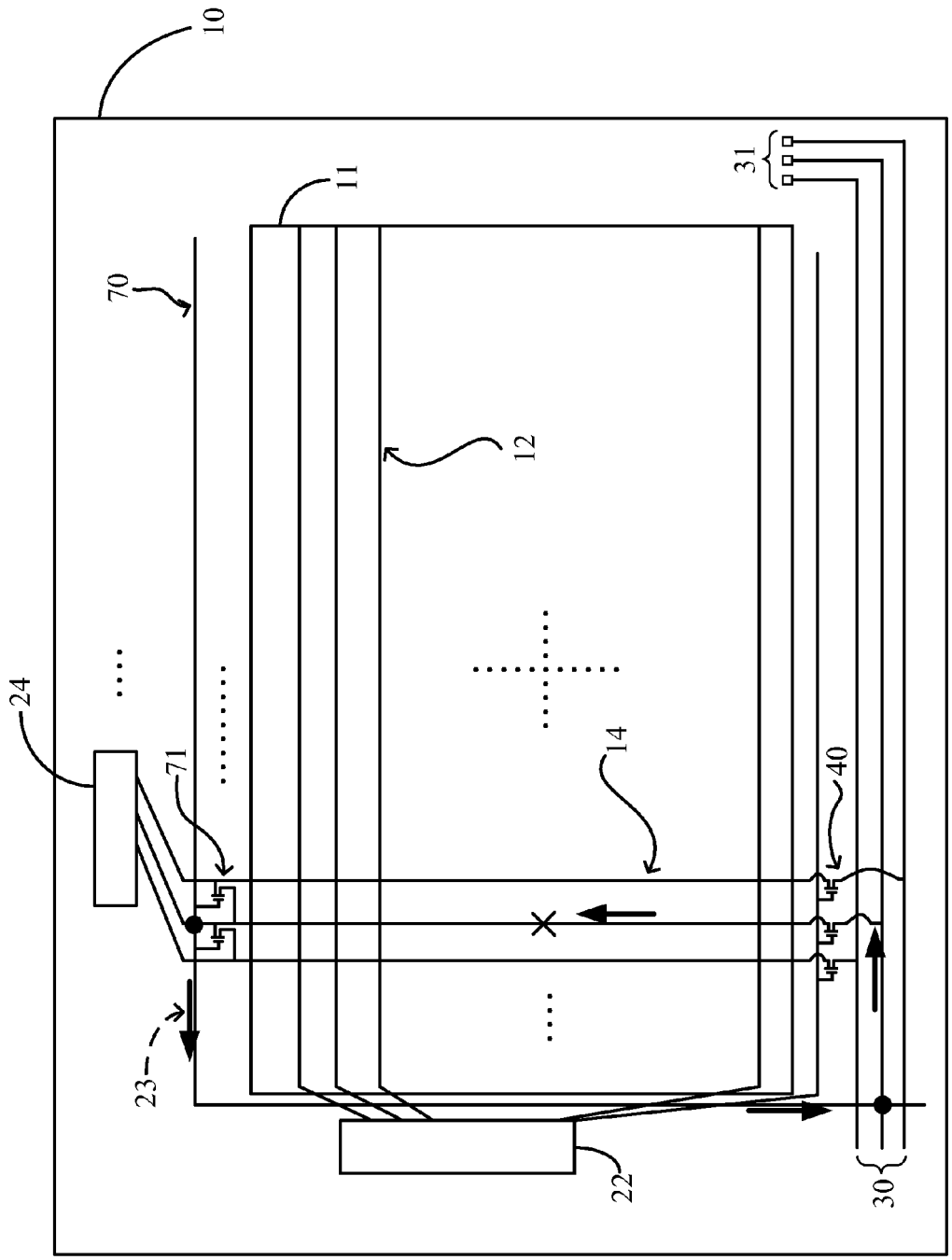
FIG. 8 is a schematic drawing illustrating a circuit of the display panel according to the third preferred embodiment of the present invention.

The following will explain an display panel according to a third preferred embodiment of the present invention in detail with drawings. In the third preferred embodiment, the repair line 16 is completely abandoned in the display panel, thereby making the available area of the periphery of the substrate maximum. Referring to FIG. 8, FIG. 8 is a schematic drawing illustrating a circuit of the display panel according to the third preferred embodiment of the present invention. The descriptions of the same elements in the first and second preferred embodiments have been explained as above mention, so we need not go into detail herein.

In the third preferred embodiment, the display panel of the first and second preferred embodiment further includes a electrostatic shielding (ESD) circuit 70 disposed on the substrate 10. The ESD circuit 70 is non-closed disposed on the periphery of the active area 11, and crosses the scan lines 12 and the signal lines 14 in an insulated manner (i.e., overlapping each other without electrical coupling). Whereas the ESD circuit 70 is not limited to be disposed on the periphery of the active area 11, it can be also disposed inside of the active area 11. The ESD circuit 70 is utilized to avoid static electricity from damaging to the circuits within the active area 11 or the TFT array (not shown for clarity). Specifically, a switch element is disposed between the ESD circuit 70, each of scan lines 12, and each of signal lines 14, such as a high voltage trigger TFT 71 (depicted only between the ESD circuit 70 and the signal lines 14). The gate terminals of the high voltage trigger TFTs 71 are electrically coupled to the ESD circuit 70, and the source and drain terminals of the high voltage trigger TFTs 71 are electrically coupled to two adjacent signal lines 14 or two adjacent scan lines 12. The high voltage trigger TFTs 71 are utilized to guide excessive static current to surrounding the scan lines 12 or the signal lines 14, thereby decreasing the damage of the circuits within the active area 11 or the TFT array by the excessive current or voltage.

In the third preferred embodiment, the ESD circuit 70 crosses but is insulated from the at least one shorting bar (such as said shorting bar group 30), as shown in FIG. 8. Specifically, the ESD circuit 70 is designed to extend from the intersections with the scan lines 12 (on the left of the active area 11), and crosses the shorting bar group 30 in an insulated manner. A contact pad 31 is disposed on one end of each shorting bar 30, and the contact pad 31 is utilized to receive external signals in cell test process.

The method for repairing the signal lines of the display panel in the third preferred embodiment of the present invention will be explained in detail in the following. Referring to FIG. 8 again, when one of the signal lines 14 is disconnected, the above-mentioned welding process (such as a laser welding) can be performed at the intersections between the ESD circuit 70 and the signal lines 14, and the intersections between the ESD circuit 70 and the shorting bar 30 which corresponds to the disconnected signal line 14. The display signals 23 (as shown in an arrow) provided from the signal line driver chips 24 transmits to the disconnect signal line 14 through the ESD protection circuit 70 for repairing the signals. Details of the repair are described in the first and second embodiment, so we won't go into detail herein.

Figure 9:
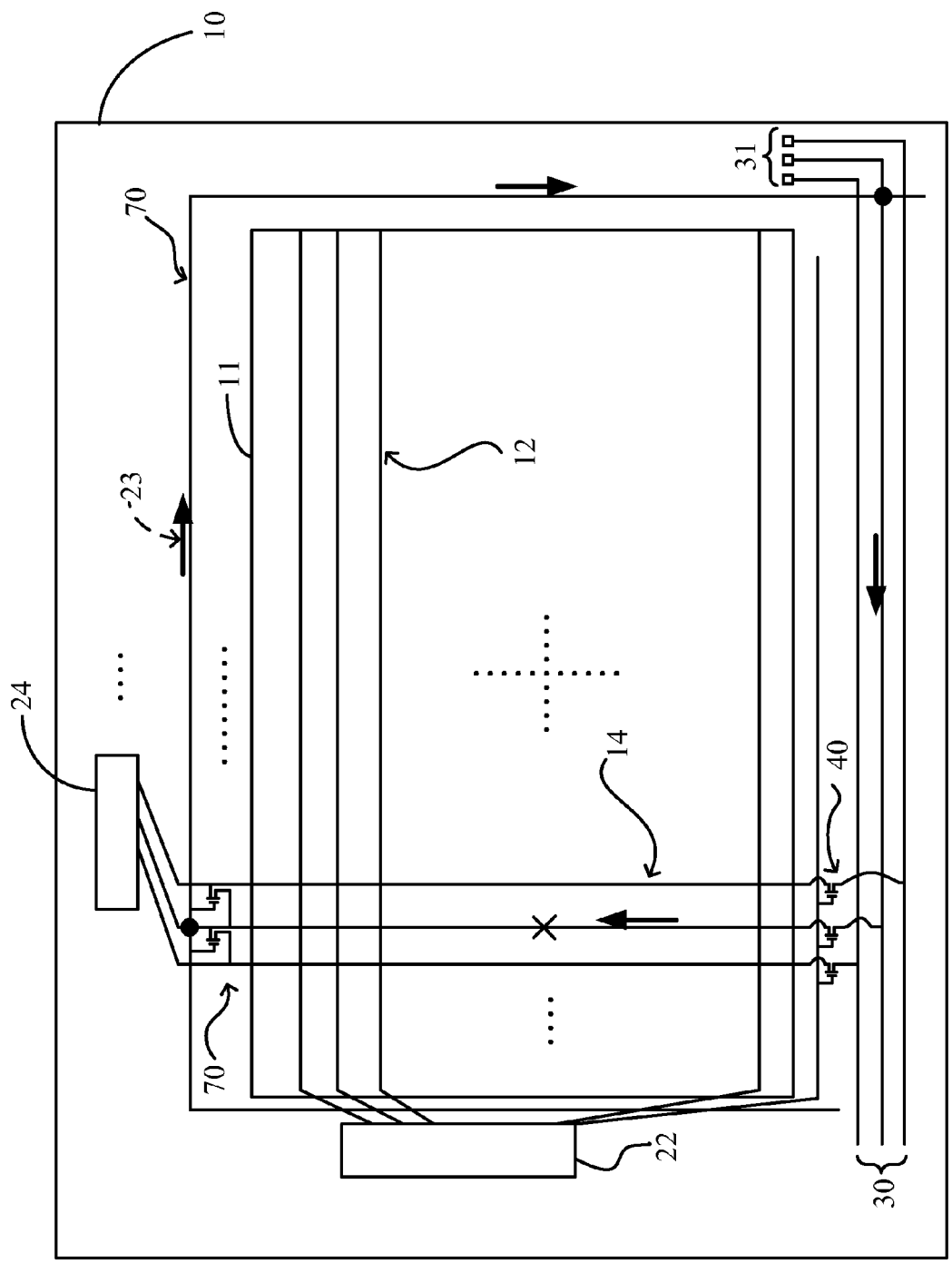
FIG. 9 is a schematic drawing illustrating a circuit of the display panel according to the fourth preferred embodiment of the present invention.

The following will explain an display panel according to a fourth preferred embodiment of the present invention in detail with drawings. Similarly, in the fourth preferred embodiment, the repair line 16 is completely abandoned in the display panel, thereby making the available area of the periphery of the substrate maximum. Referring to FIG. 9, FIG. 9 is a schematic drawing illustrating a circuit of the display panel according to the fourth preferred embodiment of the present invention. The descriptions of the same elements in the first, second and third preferred embodiments have been explained as above mention, so we won't go into detail herein.

Specifically, the difference between the fourth embodiment and the third embodiment lies in that the ESD circuit 70 is designed so as to extend from the intersections with the signal lines 14 (on the top of the active area 11), and crosses the shorting bar group 30 in an insulated manner, as shown in FIG. 9. In the other embodiments, the ESD circuit 70 can be designed to cross but be insulated from the contact pads 31. It should be noted that the present invention is not intended to limit the positions of the intersections between the ESD circuit 70 and the at least one shorting bar, and it can be implemented as long as the ESD protection circuit 70 overlaps each shorting bar. In the intersections between the ESD circuit 70 and the shorting bar group 30, an insulation layer (not shown) is disposed between the ESD circuit 70 and the shorting bar group 30 for separating thereof. The ESD circuit 70 can be disposed over or under the shorting bar group 30. Similarly, the method for repairing the signal lines of the display panel in the fourth preferred embodiment of the present invention is the same as that of the third preferred embodiment, so we won't go into detail herein.

As mentioned above, the ESD circuit is utilized to cross but be insulated from said shorting bar group on the display panel of the third and fourth preferred embodiment. When it requires repairing, the laser welding can be performed at the intersections without disposing the repair line on the periphery area of the substrate, and the available periphery area of the substrate is also increased.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A display panel, comprising:
   a substrate;
   a plurality of signal lines disposed on the substrate;
   at least one shorting bar disposed on the substrate, corresponding to the signal lines;
   a plurality of switches electrically coupled respectively to the signal lines and the at least one shorting bar;
   a plurality of auxiliary repair lines, both ends of each of the auxiliary repair lines overlapping one of a plurality of connections between the switches and the at least one shorting bar; and
   an insulation layer disposed between each of the auxiliary repair lines and each of the connections.

2. The display panel of claim 1, wherein each of the switches comprises:
   a gate pattern disposed on the substrate;
   a source line disposed on the gate pattern, an insulation layer disposed between the source line and the gate pattern, one end of the source line electrically coupled to one of the signal lines; and
   a drain line disposed on the gate pattern, the insulation layer disposed between the drain line and the gate pattern, one end of the drain line electrically coupled to the shorting bar.

3. The display panel of claim 2, wherein the source lines and the drain lines of the switches, and the signal lines are made of same metal material.

4. The display panel of claim 2, wherein the at least one shorting bar, the auxiliary repair lines and the gate pattern of each of the switches are made of same metal material.

5. The display panel of claim 1, wherein the switches comprise a plurality of thin film transistor switches, and each of the thin film transistor switches has a gate, and the thin film transistor switches are connected in cascade with each other through the gates thereof.

6. The display panel of claim 1, further comprising an electrostatic shielding circuit disposed on the substrate, wherein the electrostatic shielding circuit crosses but is insulated from the at least one shorting bar.

7. The display panel of claim 6, wherein the electrostatic shielding circuit crosses but is insulated from the signal lines.

* * * * *